(12) United States Patent
Iwamoto et al.

(10) Patent No.: US 12,723,982 B2
(45) Date of Patent: Sep. 1, 2026

(54) CELL ANALYSIS METHOD AND CELL ANALYSIS SYSTEM

(71) Applicant: CANON KABUSHIKI KAISHA, Tokyo (JP)

(72) Inventors: Yuichiro Iwamoto, Tokyo (JP); Akira Terao, Kanagawa (JP); Naomichi Matsuwaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 556 days.

(21) Appl. No.: 18/178,013

(22) Filed: Mar. 3, 2023

(65) Prior Publication Data

US 2023/0333016 A1 Oct. 19, 2023

(30) Foreign Application Priority Data

Apr. 15, 2022 (JP) ................................ 2022-067941

(51) Int. Cl.
*G01N 21/64* (2006.01)
*B01L 3/00* (2006.01)
*G01N 21/17* (2006.01)

(52) U.S. Cl.
CPC .... *G01N 21/6428* (2013.01); *B01L 3/502761* (2013.01); *G01N 2021/1765* (2013.01); *G01N 2021/6439* (2013.01)

(58) Field of Classification Search
CPC ....... G01N 21/6428; G01N 2021/1765; G01N 2021/6439; B01L 3/502761

(Continued)

(56) References Cited

U.S. PATENT DOCUMENTS 6,221,653 B1 * 4/2001 Caren .................. B01J 19/0046 422/50
7,051,654 B2 * 5/2006 Boland .................. B33Y 70/00 101/483

(Continued)

FOREIGN PATENT DOCUMENTS

JP 2022-510140 A 1/2022
WO WO-2019060857 A1 * 3/2019 ......... C12N 15/1034
WO 2020/104769 A1 5/2020

OTHER PUBLICATIONS

Giuseppe Arrabito, Bruno Pignataro, "Inkjet Printing Methodologies for Drug Screening," Analytical Chemistry 2010 82 (8), 3104-3107), DOI: 10.1021/ac100169w (Year: 2010).*

(Continued)

*Primary Examiner* — Jennifer Mehmood
*Assistant Examiner* — Eric James Shoemaker
(74) *Attorney, Agent, or Firm* — Venable LLP

(57) ABSTRACT

The cell analysis method includes: a first storage step of storing a first liquid containing a cell in a first tank; a second storage step of storing a second liquid containing a compound in a second tank; a first discharge step of discharging the first liquid to a plurality of portions on a substrate, to thereby form a plurality of first liquid droplets; a second discharge step of discharging the second liquid to the plurality of portions on the substrate in such a manner that the second liquid is allowed to be admixed with the first liquid droplets; a result acquisition step of acquiring results of a reaction between the cell and the compound; and an analysis step of analyzing the results acquired in the result acquisition step to specify a portion in which results satisfying predetermined criteria are obtained among the plurality of portions.

20 Claims, 12 Drawing Sheets

(58) Field of Classification Search
USPC .......................................................... 382/133
See application file for complete search history.

(56) References Cited

U.S. PATENT DOCUMENTS

| | | | | |
|---|---|---|---|---|
| 9,273,308 | B2 * | 3/2016 | Link | C12N 15/1068 |
| 10,040,067 | B2 * | 8/2018 | Tovar | B01L 3/0268 |
| 10,518,241 | B2 * | 12/2019 | Sampas | B01F 33/30351 |
| 11,767,557 | B2 * | 9/2023 | Love | C12Q 1/6874 506/9 |
| 2006/0153924 | A1 * | 7/2006 | Griffiths | G01N 21/6428 435/7.1 |
| 2019/0119723 | A1 | 4/2019 | Cumbie et al. | |

OTHER PUBLICATIONS

Qiang Zheng, Jiangang Lu, Hao Chen, Lei Huang, Jin Cai, Zhinan Xu, “Application of inkjet printing technique for biological material delivery and antimicrobial assays,” Analytical Biochemistry, vol. 410, Issue 2, 2011, pp. 171-176, ISSN 0003-2697, https://doi.org/10.1016/j.ab.2010.10.024. (Year: 2011).*

Wickström, H.; Hilgert, E.; Nyman, J.O.; Desai, D.; Şen Karaman, D.; De Beer, T.; Sandler, N.; Rosenholm, J.M. Inkjet Printing of Drug-Loaded Mesoporous Silica Nanoparticles—A Platform for Drug Development. Molecules 2017, 22, 2020. https://doi.org/10.3390/molecules22112020 (Year: 2017).*

Gisbert-Garzarán, M.; Manzano, M.; Vallet-Regí, M. pH-Responsive Mesoporous Silica and Carbon Nanoparticles for Drug Delivery. Bioengineering 2017, 4, 3. https://doi.org/10.3390/bioengineering4010003 (Year: 2017).*

Hewlett-Packard Company, L.P. “HP D300 Digital Dispenser Operating Manual” (Year: 2012).*

Kainkaryam and Woolf (Pooling in high-throughput drug screening. Curr Opin Drug Discov Devel. May 2009;12(3):339-50. PMID: 19396735; PMCID: PMC3204799.) (Year: 2009).*

Liberski, Albert R. Delaney, Joseph T. Jr. Schubert, Ulrich S. “One Cell-One Well”: A New Approach to Inkjet Printing Single Cell Microarrays. ACS Combinatorial Science. 13, 2. doi: 10.1021/co100061c (Year: 2011).*

Russell H. Cole et al, Printed Droplet Microfluidics for on Demand Dispensing of Picoliter Droplets and Cells, 114(33) PNAS 8728-8733 (Aug. 2017).

Yingnan Sun et al., “A Novel Picoliter Droplet Array for Parallel Real-Time Polymerase Chain Reaction Based on Double-Inkjet Printing,” 14(18) Lab Chip 3603-3610 (2014).

Notice of Reasons for Refusal in Japanese Application No. 2022-067941 (May 2026).

* cited by examiner

FIG. 10

CELL ANALYSIS METHOD AND CELL ANALYSIS SYSTEM

BACKGROUND OF THE INVENTION

Field of the Invention

The present invention relates to a cell analysis method and a cell analysis system.

Description of the Related Art

In recent drug discovery, a method called phenotypic screening, in which the effect of a compound on a cytoplasm is observed to recognize the drug efficacy thereof, has attracted attention. High-throughput screening, which has hitherto been used in many cases, is to recognize the effect of a compound on a protein. Meanwhile, the phenotypic screening can recognize the effect of a compound on a cell that is closer to living tissue, and hence the phenotypic screening has a feature of being likely to lead to the discovery of a highly effective drug.

In "Printed droplet microfluidics for on demand dispensing of picoliter droplets and cells" Proceedings of the National Academy of Sciences 114.33 (2017): p 8728-8733, a technology regarding phenotypic screening using cells is disclosed.

In addition, in U.S. Patent Application Publication No. 2019/0119723, there is a disclosure of a sample preparation method involving placing an aqueous liquid containing a primer into a layer of a hydrophobic liquid through use of a thermal inkjet device.

However, the precedent disclosed in "Printed droplet microfluidics for on demand dispensing of picoliter droplets and cells" Proceedings of the National Academy of Sciences 114.33 (2017): p 8728-8733 has yet to be sufficient from the viewpoint of performing phenotypic screening at high throughput.

In addition, in the technology disclosed in U.S. Patent Application Publication No. 2019/0119723, sample preparation can be performed at high efficiency, but the configuration for applying the technology to phenotypic screening is not sufficiently described.

SUMMARY OF THE INVENTION

The present invention has been made in view of the above-mentioned problems. That is, an object of the present invention is to provide a cell analysis method and a cell analysis system capable of performing phenotypic screening at high throughput.

A cell analysis method according to one aspect of the present invention includes: a first storage step of storing a first liquid containing a cell in a first tank; a second storage step of storing a second liquid in a second tank, the second liquid containing a compound and being compatible with the first liquid; a first discharge step of discharging the first liquid to a plurality of portions on a substrate through use of a first discharge portion connected to the first tank so as to allow circulation of the liquid, to thereby form a plurality of first liquid droplets; a second discharge step of discharging the second liquid to the plurality of portions on the substrate through use of a second discharge portion connected to the second tank so as to allow circulation of the liquid in such a manner that the second liquid is allowed to be admixed with the first liquid droplets; a result acquisition step of acquiring results of a reaction between the cell and the compound caused by admixture of the first liquid droplets and the second liquid discharged from the second discharge portion; and an analysis step of analyzing the results acquired in the result acquisition step to specify a portion in which results satisfying predetermined criteria are obtained among the plurality of portions.

Further, a cell analysis system according to another aspect of the present invention includes: a stage configured to allow a substrate to be set thereon; a first tank configured to store a first liquid containing a cell; a second tank configured to store a second liquid that contains a compound and is compatible with the first liquid; a first discharge portion, which is connected to the first tank so as to allow circulation of the liquid, and which is configured to discharge the first liquid to a plurality of portions on the substrate, to thereby form a plurality of first liquid droplets; a second discharge portion, which is connected to the second tank so as to allow circulation of the liquid, and which is configured to discharge the second liquid to the plurality of portions on the substrate in such a manner that the second liquid is allowed to be admixed with the first liquid droplets; a result acquisition portion configured to acquire results of a reaction between the cell and the compound caused by admixture of the first liquid droplets and the second liquid discharged from the second discharge portion; and an analysis portion configured to analyze the results acquired by the result acquisition portion to specify a portion in which results satisfying predetermined criteria are obtained among the plurality of portions.

Further features of the present invention will become apparent from the following description of exemplary embodiments with reference to the attached drawings.

BRIEF DESCRIPTION OF THE DRAWINGS

FIG. 10 is a flowchart for illustrating steps in a cell analysis method according to an embodiment of the present invention.

DESCRIPTION OF THE EMBODIMENTS

Figure 1:
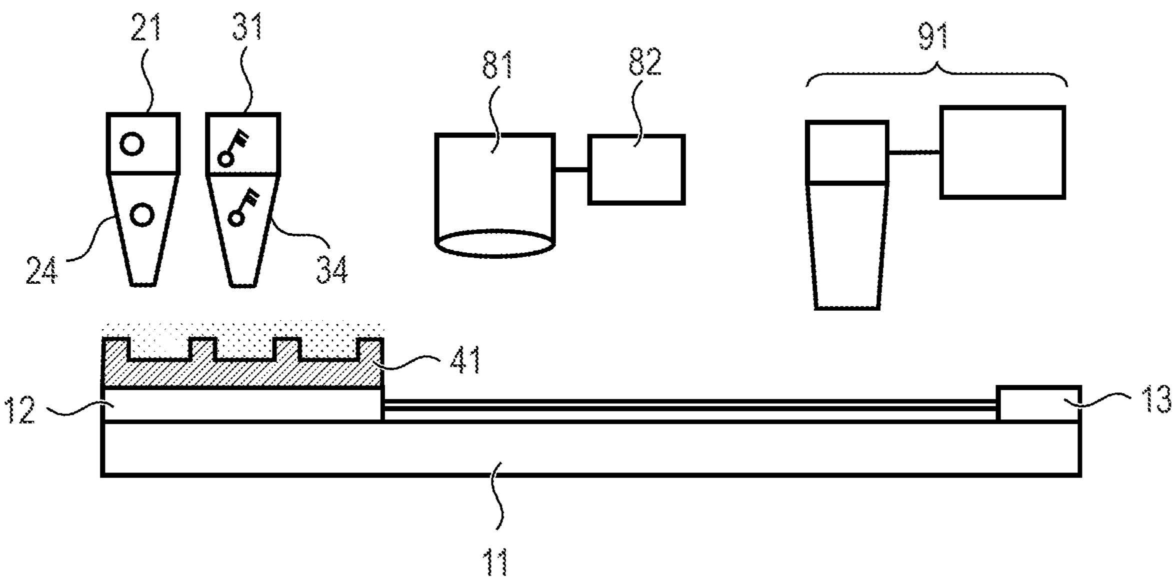
FIG. 1 is a view for illustrating an example of a suitable mode of a cell analysis system according to the present invention.

A cell analysis method according to an embodiment of the present invention includes the following steps:

(1) a first storage step of storing a first liquid containing a cell in a first tank;

(2) a second storage step of storing a second liquid that contains a compound and is compatible with the first liquid in a second tank;

(3) a first discharge step of discharging the first liquid to a plurality of portions on a substrate through use of a first discharge portion connected to the first tank so as to allow circulation of the liquid, to thereby form a plurality of first liquid droplets;

(4) a second discharge step of discharging the second liquid to the plurality of portions on the substrate through use of a second discharge portion connected to the second tank so as to allow circulation of the liquid in such a manner that the second liquid is allowed to be admixed with the first liquid droplets;

(5) a result acquisition step of acquiring results of a reaction between the cell and the compound caused by admixture of the first liquid droplets and the second liquid discharged from the second discharge portion; and (6) an analysis step of analyzing the results acquired in the result acquisition step to specify a portion in which results satisfying predetermined criteria are obtained among the plurality of portions.

In addition, a cell analysis system according to the embodiment of the present invention includes a stage configured to allow a substrate to be set thereon, a first tank, a second tank, a first discharge portion, a second discharge portion, a result acquisition portion, and an analysis portion.

The first tank is a constituent element that stores a first liquid containing cells. In addition, the second tank is a constituent element that stores a second liquid that contains compounds and is compatible with the first liquid.

The first discharge portion is connected to the first tank so as to allow circulation of the liquid and is configured to discharge the first liquid to a plurality of portions on the substrate, to thereby form a plurality of first liquid droplets. In addition, the second discharge portion is connected to the second tank so as to allow circulation of the liquid and is configured to discharge the second liquid to the plurality of portions on the substrate in such a manner that the second liquid can be admixed with the first liquid droplets.

The result acquisition portion is configured to acquire the results of the reaction between the cell and the compound caused by admixture of the first liquid droplets and the second liquid discharged from the second discharge portion.

The analysis portion is configured to analyze the results acquired by the result acquisition portion to specify a portion in which results satisfying predetermined criteria have been obtained among the plurality of portions. As described above, the cell analysis method and the cell analysis system according to the embodiment of the present invention can generate a large number of reaction sites (for example, a reaction site for analyzing the effect of a drug on a cell) between the liquid containing cells stored in the tank and the liquid containing compounds (for example, a drug) at high speed. Accordingly, phenotypic screening can be performed at high throughput.

A suitable embodiment of the present invention is specifically described below by way of an example.

FIG. 1 is a view for illustrating an example of a suitable mode of a cell analysis system according to the present invention.

A cell analysis system 10 includes a first tank 21, a first discharge portion 24, a second tank 31, a second discharge portion 34, a result acquisition device 81, an analysis device 82, a compound identification device 91, a common platform 11, a stage 12, and a stage control unit 13.

Figure 2:
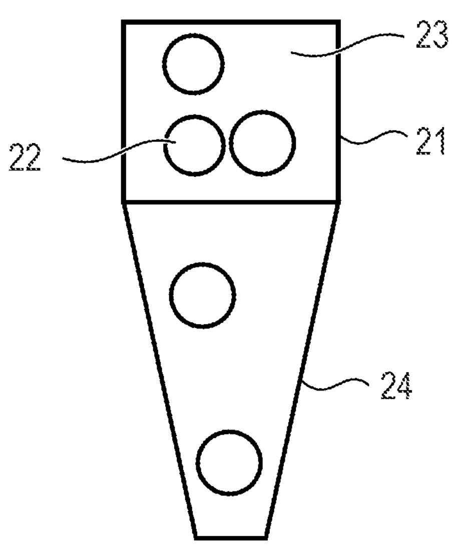
FIG. 2 is a view for illustrating an example of a first tank and a first discharge portion.

FIG. 2 is a view for illustrating the first tank 21 and the first discharge portion 24.

In a first storage step, a first liquid 23 containing cells 22 to be analyzed is stored in the first tank 21. The first discharge portion 24 is connected to the first tank 21 so as to allow circulation of the liquid and discharges the first liquid 23 to a plurality of portions on a substrate 41 set on the stage 12 by an inkjet system in a first discharge step. A method of discharging the first liquid 23 is not limited to the inkjet system.

It is preferred that the first liquid 23 be an aqueous liquid from the viewpoint of, for example, stability of the cells 22. Specifically, the first liquid 23 may be, for example, a phosphate buffer, saline, or phosphate buffered saline (PBS). In addition, the first liquid 23 may contain a viscosity modifier or a surfactant in order to enhance stability during discharge to such an extent as not to influence the cells 22.

The cells 22 to be analyzed may be model cells of disease or the like, such as HeLa cells or iPS cells derived from a human, or cells derived from an organism other than a human, such as cells derived from a zebrafish. In addition, the cells 22 may also be plant cells, bacteria, or fungi, and further, viruses may be used instead of cells serving a constituent element represented by the cells 22 in this embodiment. In addition, the cells 22 are not limited to single cells but may be spheroids or organoids. The cells 22 are preferably floating cells but may be adherent cells. The cells 22 may each contain a fluorescent dye such as a fluorescent protein for ease of analysis.

When the discharge method of the first discharge portion 24 is the inkjet system, there are given a pressurization system using a piezoelectric element, a bubble jet (trademark) system using a heater, and the like. In particular, through use of the mechanism of an on-demand inkjet device as the discharge method of the first discharge portion 24, high-speed discharge can be performed.

Figure 3A:
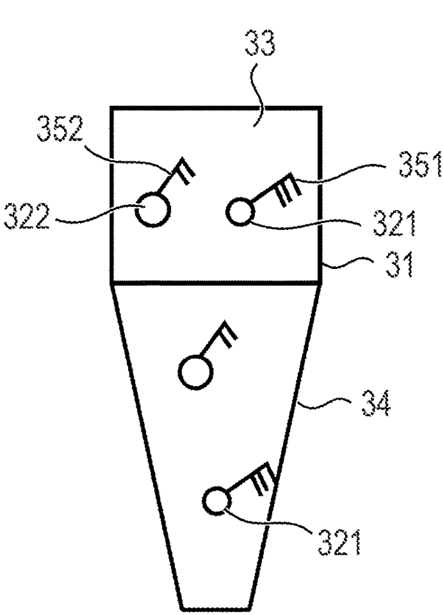
FIG. 3A is a view for illustrating an example of a second tank and a second discharge portion.

FIG. 3A is a view for illustrating the second tank 31 and the second discharge portion 34.

In a second storage step, a second liquid 33, which contains a first compound 321 and a second compound 322, and which is compatible with the first liquid 23, is stored in the second tank 31. The second discharge portion 34 is connected to the second tank 31 so as to allow circulation of the liquid and discharges the second liquid 33 to the plurality of portions on the substrate 41 set on the stage 12 by the inkjet system in a second discharge step. The method of discharging the second liquid 33 is not limited to the inkjet system.

The second liquid 33 is preferably an aqueous liquid. Specifically, the second liquid 33 may be, for example, a phosphate buffer, saline, or PBS, or may be a solution of dimethyl sulfoxide (DMSO) diluted with a phosphate buffer, saline, PBS, pure water, or the like. In addition, the second liquid 33 may also contain a viscosity modifier or a surfactant in order to enhance stability during discharge to such an extent as not to influence the first compound 321 and the second compound 322.

The first compound 321 and the second compound 322 contained in the second liquid 33 stored in the second tank 31 may each be encapsulated in a region surrounded by a liquid that is incompatible with the second liquid 33.

Figures 3B, 3C, 3D:
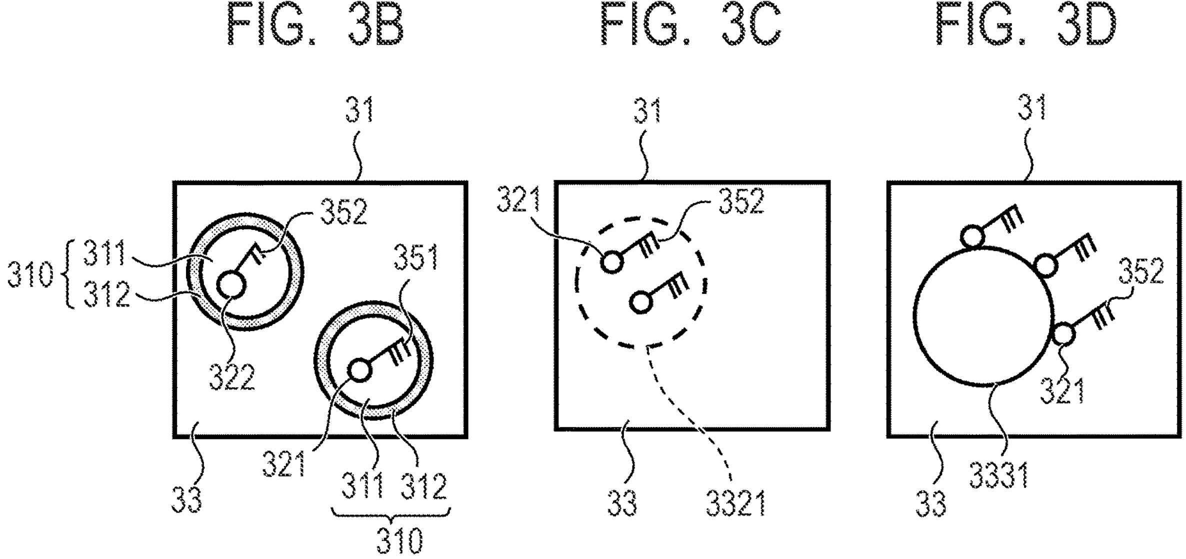
FIG. 3B is a view for illustrating a state in which compounds are each encapsulated in a region surrounded by a liquid that is incompatible with a second liquid.
FIG. 3C is a view for illustrating a state in which the compounds are carried in a porous fine particle.
FIG. 3D is a view for illustrating a state in which the compounds are adsorbed to a surface of an adsorbing fine particle.

FIG. 3B is a view for illustrating a state in which the first compound 321 and the second compound 322 contained in the second liquid 33 are encapsulated in a region surrounded by a liquid that is incompatible with the second liquid 33.

The inside of the second tank 31 is filled with the second liquid 33, and a fourth liquid 311 and the first compound 321 provided with a labeling substance 351 for identification are confined in a membrane formed of a fifth liquid 312. Similarly, the fourth liquid 311 and the second compound 322 provided with a labeling substance 352 for identification are confined in a membrane formed of the fifth liquid 312. Here, the fourth liquid 311 is a liquid that is incompatible with the fifth liquid 312, and the fifth liquid 312 is a liquid that is incompatible with the second liquid 33 and is compatible with a third liquid 43 described later. The fifth liquid 312 may be, for example, HFE-7500 (manufactured by 3M) having a hydrofluoroether (HFE) structure as fluorine oil.

The fourth liquid 311 forms a double liquid droplet 310 in the second tank 31 together with the membrane formed of the fifth liquid 312. The first compound 321 or the second compound 322 confined in the membrane formed of the fifth liquid 312 include one or more molecules.

The first compound 321 and the second compound 322 contained in the second liquid 33 may be carried in a porous fine particle 3321. FIG. 3C is a view for illustrating a state in which the first compounds 321 are carried in the porous fine particle.

The inside of the second tank 31 is filled with the second liquid 33, and the porous fine particle 3321 carries therein the first compounds 321 each provided with the labeling substance 351 for identification. Although not shown, the porous fine particle 3321 may carry therein the second compound 322.

The porous fine particle may be a polystyrene fine particle having a porous surface with a particle diameter of, for example, 1 μm or less. In addition, the first compound 321 or the second compound 322 may be carried in, for example, a lipid particle or polyethylene glycol (PEG) instead of the porous fine particle.

The first compound 321 and the second compound 322 contained in the second liquid 33 may each be carried on the surface of the fine particle.

FIG. 3D is a view for illustrating a state in which the first compounds 321 are adsorbed to the surface of an adsorbing fine particle 3331.

The inside of the second tank 31 is filled with the second liquid 33, and the adsorbing fine particle 3331 carries on a surface thereof the first compounds 321 each provided with the labeling substance 351 for identification. Although not shown, the adsorbing fine particle 3331 may carry on a surface thereof the second compound 322.

The adsorbing fine particle may be, for example, a polystyrene fine particle having a particle diameter of 1 μm or less, which has been subjected to surface treatment for improving the adsorption with the compound.

In this embodiment, although there is described an example in which the second liquid 33 contains a plurality of kinds of compounds, specifically, two kinds of compounds, that is, the first compound 321 and the second compound 322 as illustrated in FIG. 3A, there is no limitation on the number of kinds of compounds contained in the second liquid 33. For example, the second liquid 33 may contain one kind or about 1,000 kinds of compounds.

For example, as the cells 22 contained in the first liquid 23, heterogeneous cells in which each cell has specificity may be used, and as the compound contained in the second liquid 33, a specific test compound for testing the responsiveness of each of the cells may be used. In this case, from the viewpoint of recognizing the response of each of the cells to the specific test compound, one kind of the test compound is preferably used, but a plurality of kinds of test compounds may also be used at the same time.

The heterogeneous cells may be model cells of disease or the like, such as HeLa cells or iPS cells derived from a human. Alternatively, the heterogenous cells may be heterogenous cells of a plurality of diseases or the like, or cells subjected to gene editing and the like.

The first compound 321 and the second compound 322 may each be, for example, a low-molecular-weight compound, a medium-sized molecules compound, a biopharmaceutical, or an existing pharmaceutical compound.

The first compound 321 and the second compound 322 are modified with labeling substances 351 and 352, respectively, so as to be uniquely identified for the kind of the compound. In the labeling substances 351 and 352, a DNA encoding library may be utilized in order to use as a labeling substance, for example, specific deoxyribonucleic acid (DNA) functioning as a barcode, and the labeling substances 351 and 352 may be fluorescent substances.

When the discharge method of the second discharge portion 34 is the inkjet system, there are given a pressurization system using a piezoelectric element, a bubble jet (trademark) system using a heater, and the like. In particular, through use of the mechanism of an on-demand inkjet device as the discharge method of the second discharge portion 34, high-speed discharge can be performed.

Figure 4A:
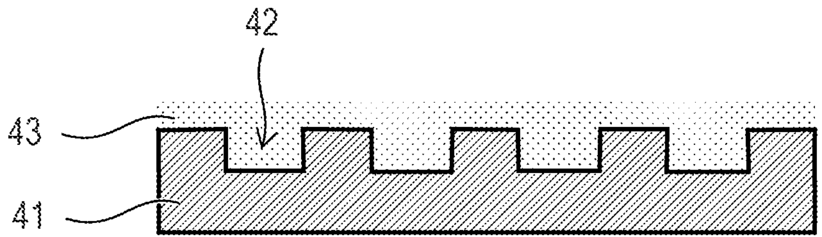
FIG. 4A is a sectional view for illustrating an example of a substrate.
Figure 4B:
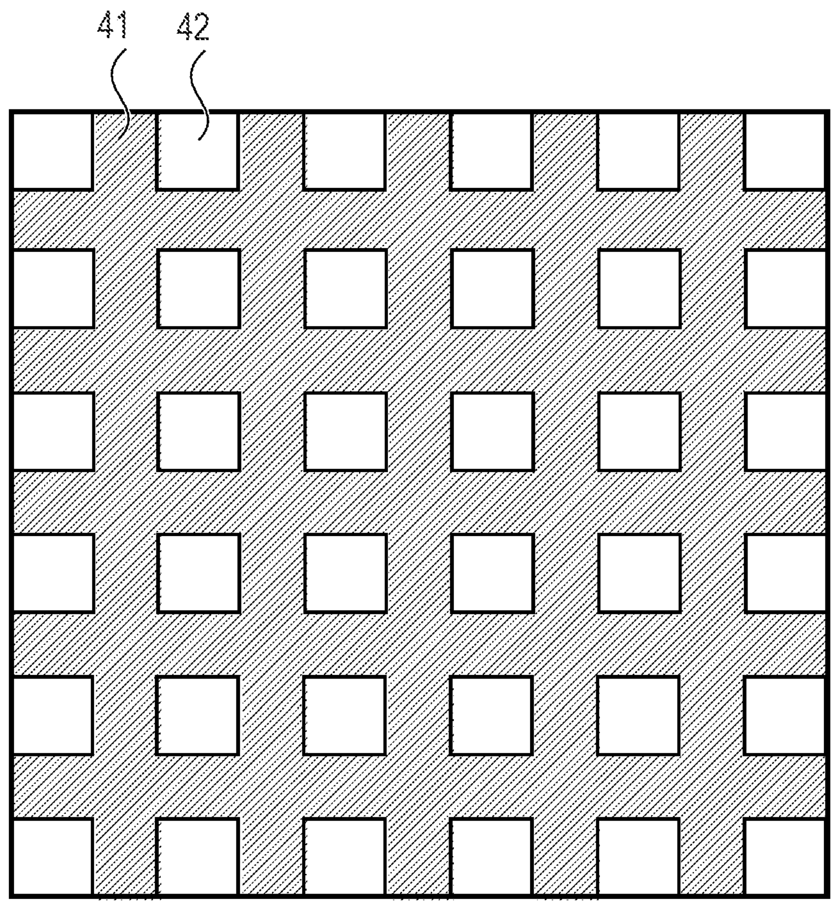
FIG. 4B is a top view for illustrating the example of the substrate.

FIG. 4A and FIG. 4B are each a view for illustrating the substrate 41. FIG. 4A is a sectional view, and FIG. 4B is a top view.

The substrate 41 includes a plurality of wells 42 separated from each other by two-dimensional compartments. The plurality of portions on the substrate 41 to which the first liquid 23 and the second liquid 33 are discharged in the first discharge step and the second discharge step, respectively, correspond to portions in which the plurality of wells 42 are formed. When the substrate 41 includes the wells 42, respective reaction systems in the plurality of portions can be reliably made independent of each other. Here, when the respective reaction systems in the plurality of portions on the substrate 41 can be made independent of each other, for example, by setting the distance between the plurality of portions to be sufficiently large, the substrate 41 that does not include the wells 42 may also be used.

The substrate 41 is made of a material such as an acrylic resin or glass, and a 96-hole or 384-hole microplate generally used in biochemistry and clinical laboratory tests may be used as the substrate 41.

The above-mentioned plurality of portions on the substrate 41 include the third liquid 43 that is incompatible with both the first liquid 23 and the second liquid 33. That is, a layer formed of the third liquid 43 is formed on the wells 42. The third liquid 43 is preferably an oil-based liquid and may be, for example, HFE-7500 (manufactured by 3M) having a hydrofluoroether (HFE) structure as fluorine oil.

The third liquid 43 may be provided in such a manner that the depth thereof exceeds the height of each of the compartments defining the wells 42, or may be provided in such a manner that the depth thereof falls below the height of each of the compartments.

As illustrated in FIG. 4B, the substrate 41 has specific positions that can be specified by the wells 42. Here, the specific positions on the substrate 41 that can be specified by the wells 42 may be used as addresses. The address is, for example, a number representing a specific position on the substrate 41 that can be specified, and the top left position on the substrate 41 illustrated in FIG. 4B can be represented by a number such as 00. The address is described as a position that can be specified by the well 42 in this embodiment, but in the present invention, the address has significance as a portion on the substrate 41 to which the first liquid 23 and the second liquid 33 are discharged regardless of the presence or absence of the well 42.

Figure 5:
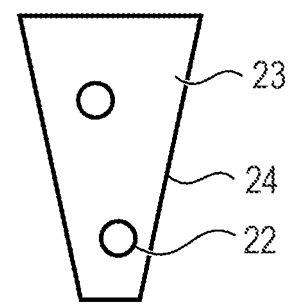
FIG. 5 is a view for illustrating a state in which a water-based liquid containing cells has been discharged to the substrate through use of the first discharge portion in a first discharge step.
Figure 5:
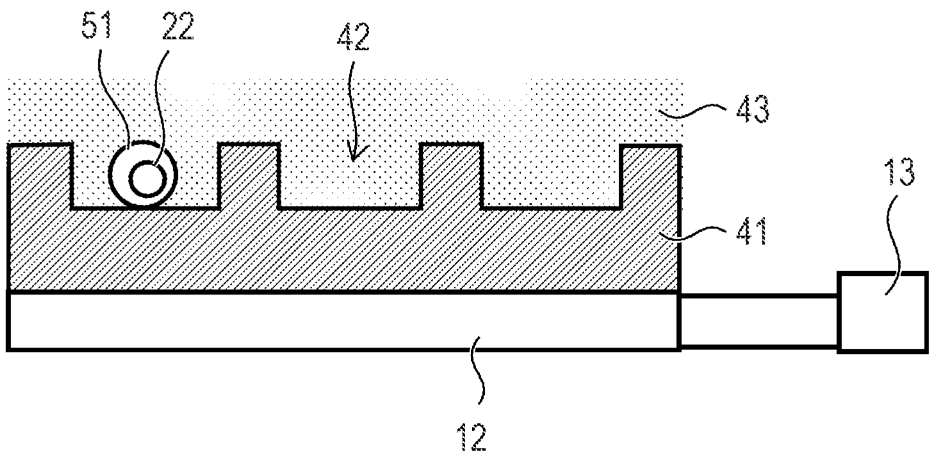

FIG. 5 is a view for illustrating a state in which the first liquid 23 containing the cells 22 has been discharged to the substrate 41 through use of the first discharge portion 24 in the first discharge step.

The substrate 41 is set on the stage 12, and the relative position between the first discharge portion 24 and the substrate 41 may be adjusted by moving the stage 12 through drive of the stage control unit 13.

In the first discharge step, the first liquid 23 is discharged to the plurality of portions on the substrate 41 through use of the first discharge portion 24 to form a plurality of first liquid droplets 51. In this embodiment, the wells 42 formed in the plurality of portions on the substrate 41 include the third liquid 43, and the first liquid droplets 51 are formed in the third liquid 43. When the third liquid 43 is not provided in the plurality of portions on the substrate 41, the first liquid droplets 51 may be formed on the surface of the substrate 41 in the plurality of portions on the substrate 41.

It is preferred that, in the first discharge step, the first discharge portion 24 discharge the first liquid 23 so that the first liquid 23 discharged in one discharge contains one or more cells 22. With this configuration, the first liquid droplets 51 each contain one or more cells 22. When the first liquid droplet 51 does not contain the cell 22, it can be specified by the result acquisition device 81 that the cell 22 is not contained.

It is preferred that the liquid amount in which the first discharge portion 24 discharges the first liquid 23 at one time is such that the first liquid 23 discharged at one time contains one cell 22 on average. The liquid amount in which the first discharge portion 24 discharges the first liquid 23 at one time may be such that, for example, as a result of a plurality of discharges, each address on the substrate to which the liquid is discharged contains one cell 22 on average.

When the discharge of the first liquid 23 to one address on the substrate 41 is finished, the stage 12 is moved to change the relative position between the first discharge portion 24 and the substrate 41 so that the first discharge portion 24 can discharge the first liquid 23 to another address on the substrate 41. The first discharge portion 24 discharges the first liquid 23 containing the cells 22 again to generate the first liquid droplet 51 at a new address. Then, the stage 12 is moved again to readjust the relative position between the first discharge portion 24 and the substrate 41. In this manner, the first liquid droplets 51 are generated at all the required addresses on the substrate 41.

Here, an example of adjusting the relative position between the substrate 41 and the first discharge portion 24 by moving the stage 12 through drive of the stage control unit 13 is described, but the present invention is not limited thereto. For example, the relative position may be adjusted by fixing the position of the substrate 41, providing the first discharge portion 24 with a drive mechanism, and moving the first discharge portion 24.

Figure 6:
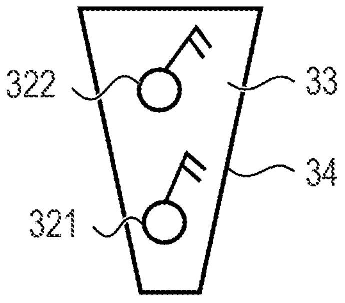
FIG. 6 is a view for illustrating a state in which the second liquid containing the compounds has been discharged to the substrate through use of the second discharge portion in a second discharge step.
Figure 6:
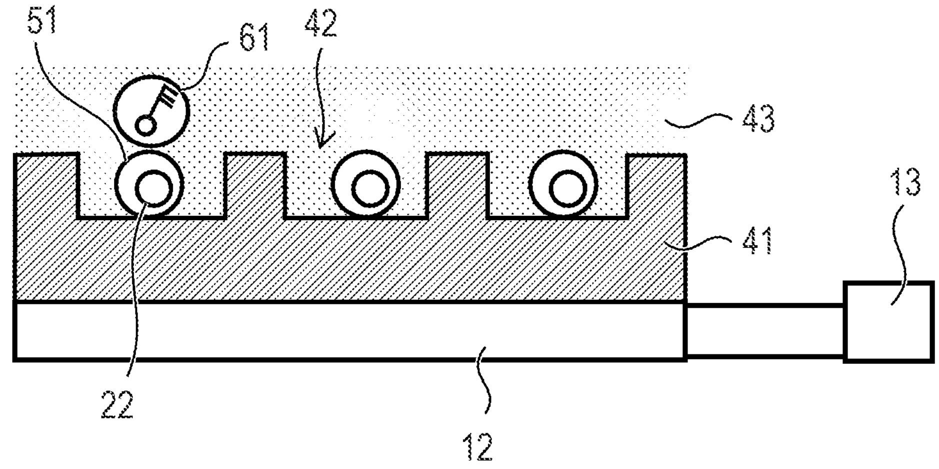

FIG. 6 is a view for illustrating a state in which the second liquid 33 containing the first compound 321 and the second compound 322 has been discharged to the substrate 41 through use of the second discharge portion 34 in the second discharge step.

The relative position between the second discharge portion 34 and the substrate 41 may be adjusted by moving the stage 12 through drive of the stage control unit 13.

In the second discharge step, the second liquid 33 is discharged to the plurality of portions on the substrate 41 through use of the second discharge portion 34 in such a manner that the second liquid 33 can be admixed with the first liquid droplets 51. In this embodiment, the first liquid droplets 51 containing the cells 22 are formed in the third liquid 43. In the second discharge step, the second liquid 33 is discharged so as to form second liquid droplets 61 in the third liquid 43. After that, the first liquid droplets 51 and the second liquid droplets 61 can be admixed with each other through the first liquid droplets 51 and the second liquid 33 discharged from the discharge portion 34 contacting with each other.

In the second tank 31, when the first compound 321 and the second compound 322 contained in the second liquid 33 are each encapsulated in a region surrounded by the fifth liquid 312 as illustrated in FIG. 3B, the second discharge portion 34 discharges the double liquid droplets 310 to the substrate 41. Then, liquid droplets are generated in the third liquid 43 provided on the substrate 41. In this case, the fifth liquid 312 and the third liquid 43 are compatible with each other, and hence the fifth liquid 312 and the third liquid 43 are assimilated. With this configuration, the second liquid droplets 61 are formed in the third liquid 43 by the fourth liquid 311 containing the first compound 321 or the fourth liquid 311 containing the second compound 322.

In addition, when the third liquid 43 is not provided in the plurality of portions on the substrate 41, for example, the second liquid 33 may be discharged through use of the second discharge portion 34 so as to be brought into contact with and land on the first liquid droplets 51 formed on the surface of the substrate 41. Alternatively, there may be provided, for example, a mechanism which allows the first liquid droplets 51 and the second liquid droplets 61 to be brought into contact with each other after the second liquid 33 discharged from the second discharge portion 34 lands on the substrate 41 to form the second liquid droplets 61. With this configuration, the first liquid droplets 51 and the second liquid 33 discharged from the second discharge portion 34 can be admixed with each other.

It is preferred that the second discharge portion discharge the second liquid 33 in the second discharge step so that the second liquid 33 discharged in one discharge contains one or more molecules of at least any one of the first compound 321 or the second compound 322. With this configuration, the second liquid droplets 61 each contain one or more molecules of at least any one of the first compound 321 or the second compound 322. For example, when a specific character is changed by the reaction between the cells 22 and a plurality of molecules of the first compound 321 or the second compound 322, it is preferred that the second liquid droplets 61 each contain a required number of molecules of the first compound 321 or the second compound 322 on average. When the second liquid droplet 61 does not contain the molecule of the first compound 321 or the second compound 322, it can be specified in the result acquisition device 81 or the compound identification device 91 that the first compound 321 or the second compound 322 is not contained.

It is preferred that the liquid amount in which the second discharge portion 34 discharges the second liquid 33 at one time is such that the second liquid 33 discharged at one time contains one molecule of the first compound 321 or the second compound 322 on average. The liquid amount in which the second discharge portion 34 discharges the second liquid 33 at one time may be such that, for example, as a result of a plurality of discharges, each address on the substrate 41 to which the liquid is discharged contains one molecule of the first compound 321 or the second compound 322 on average.

When the discharge of the second liquid 33 to one address on the substrate 41 is finished, the stage 12 is moved to change the relative position between the second discharge portion 34 and the substrate 41 so that the second discharge portion 34 can discharge the second liquid 33 to another address on the substrate 41. The second discharge portion 34 discharges the second liquid 33 again to generate the second liquid droplet 61 at a new address. Then, the stage 12 is moved again to readjust the relative position between the second discharge portion 34 and the substrate 41. In this manner, the second liquid droplets 61 are generated at all the required addresses on the substrate 41.

Here, an example of adjusting the relative position between the substrate 41 and the second discharge portion 34 by moving the stage 12 through drive of the stage control unit 13 is described, but the present invention is not limited thereto. For example, the relative position may be adjusted by fixing the position of the substrate 41, providing the second discharge portion 34 with a drive mechanism, and moving the second discharge portion 34.

In addition, in the foregoing, an example of forming the second liquid droplets 61 by the second discharge portion 34 after forming the first liquid droplets 51 at all the required addresses on the substrate 41 is described, but the present invention is not limited thereto. For example, the first discharge portion 24 and the second discharge portion 34 are arranged adjacent to each other, and the first liquid 23 is discharged to an address on the substrate 41 through use of the first discharge portion 24 to form the first liquid droplet 51. Subsequently, immediately after the foregoing, the second liquid 33 is discharged to the same address through use of the second discharge portion 34 to form the second liquid droplet 61. This sequence of steps may be repeated.

Figure 7:
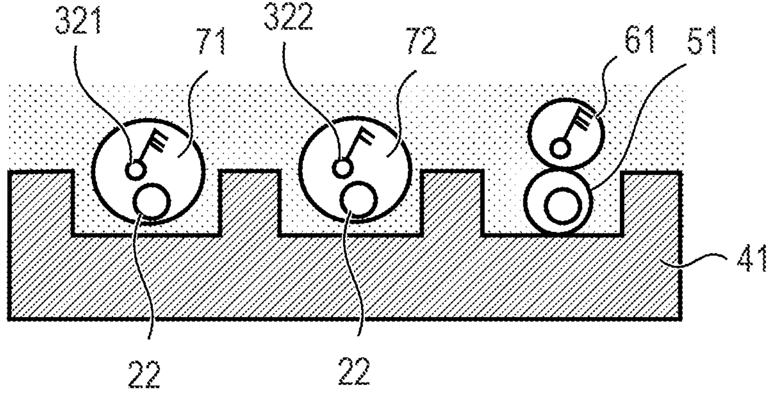
FIG. 7 is a view for schematically illustrating a state of admixture of first liquid droplets and second liquid droplets.

FIG. 7 is a view for schematically illustrating a state of admixture of the first liquid droplets 51 and the second liquid droplets 61.

At each specific position on the substrate 41 that can be specified, the first liquid droplet 51 and the second liquid droplet 61 are present in the third liquid 43, respectively, as separate liquid droplets immediately after being formed. Subsequently, with the passage of time, coalescence occurs when the first liquid droplet 51 and the second liquid droplet 61 are brought into contact with each other. As a result, a first coalesced liquid droplet 71 in which the first liquid droplet 51 and the second liquid droplet 61 containing the first compound 321 are coalesced and a second coalesced liquid droplet 72 in which the first liquid droplet 51 and the second liquid droplet 61 containing the second compound 322 are coalesced are generated. In the first coalesced liquid droplet 71, the first compound 321 and the cell 22 react with each other. In the second coalesced liquid droplet 72, the second compound 322 and the cell 22 react with each other. When the coalescence of the first liquid droplet 51 and the second liquid droplet 61 does not occur, the reaction of the cells 22 does not occur, but the absence of the reaction can be specified by the result acquisition device 81. In addition, the second liquid droplet 61 preferably contains only one kind of any one of the first compound 321 or the second compound 322, but may contain both the first compound 321 and the second compound 322. Through the above-mentioned steps, in the coalesced liquid droplet on the substrate 41, one cell 22 and one kind of the compound are preferably allowed to react with each other.

The first compound 321 or the second compound 322 diffuses into the first coalesced liquid droplet 71 or the second coalesced liquid droplet 72 over time when the first compound 321 or the second compound 322 is carried in the porous fine particle 3321 as illustrated in FIG. 3C. Alternatively, when the porous fine particle 3321 is incorporated into the cell 22, the first compound 321 or the second compound 322 is allowed to react with the cell 22 in the first coalesced liquid droplet 71 or the second coalesced liquid droplet 72.

In addition, the first compound 321 or the second compound 322 diffuses into the first coalesced liquid droplet 71 or the second coalesced liquid droplet 72 over time also when the first compound 321 or the second compound 322 is carried on the surface of the adsorbing fine particle 3331 as illustrated in FIG. 3D. Alternatively, when the adsorbing fine particle 3331 is incorporated into the cell 22, the first compound 321 or the second compound 322 is allowed to react with the cell 22 in the first coalesced liquid droplet 71 or the second coalesced liquid droplet 72.

Figure 8:
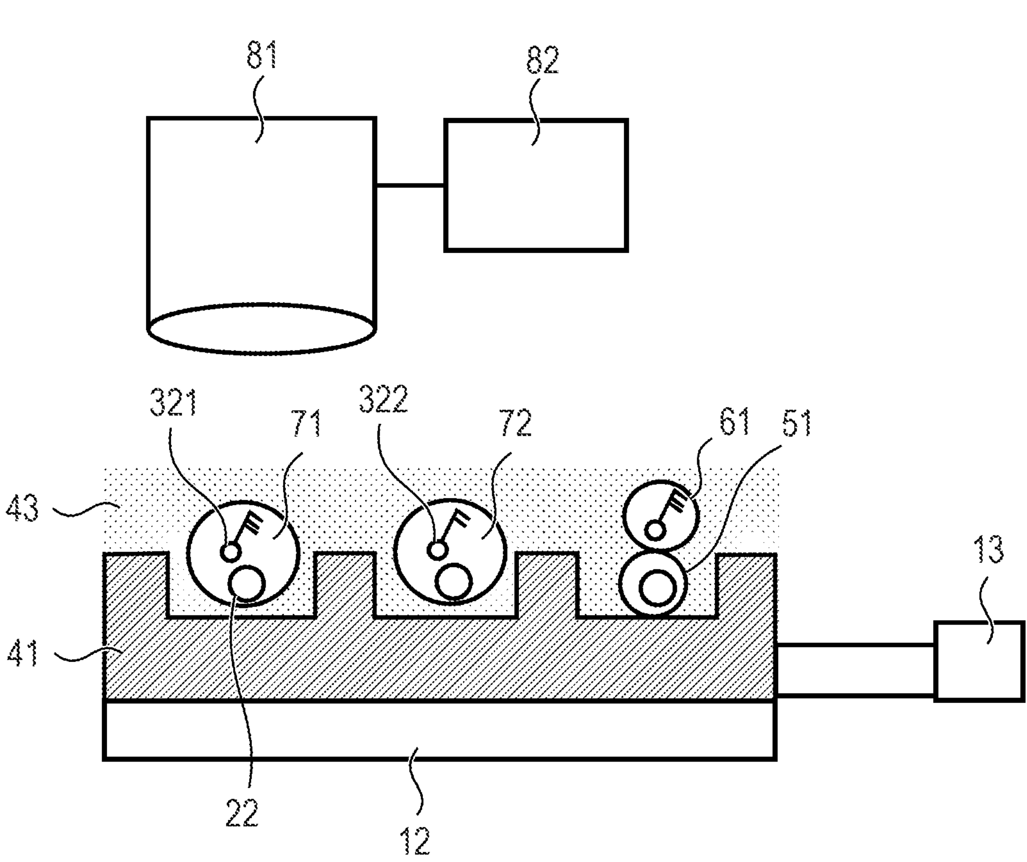
FIG. 8 is a view for illustrating a state in which the results of the reaction at each specific position on the substrate that can be specified are acquired.

FIG. 8 is a view for illustrating a state in which the results of the reaction at each specific position on the substrate 41 that can be specified are acquired.

The result acquisition device 81 serving as a result acquisition portion is used by being connected to the analysis device 82 serving as an analysis portion. The result acquisition device 81 is a microscope that can acquire an optical image or the like, and may be a phase-contrast microscope or a fluorescence microscope that can acquire a fluorescent image through irradiation of excitation light. The optical image or the like acquired by the result acquisition device 81 is analyzed for an image by the analysis device 82.

The analysis device 82 may be a personal computer, a server system capable of performing parallel processing, or a cloud computing system.

The result acquisition device 81 acquires the results of the reaction between the cell 22 and the first compound 321 or the second compound 322, which is caused by admixture of the first liquid droplet 51 and the second liquid 33 in the result acquisition step. Specifically, the result acquisition device 81 acquires an optical image of the cell 22 of the first coalesced liquid droplet 71, the second coalesced liquid droplet 72, or the first liquid droplet 51 and the second liquid droplet 61 in which coalescence has not occurred at an address on the substrate 41 in the result acquisition step. Depending on the setting of a field of view of the result acquisition device 81, for example, the optical image may be an optical image at one address or an optical image simultaneously including a plurality of addresses.

The relative position between the result acquisition device 81 and the substrate 41 is adjusted by moving the stage 12 through drive of the stage control unit 13, to thereby acquire optical images at all the required addresses on the substrate 41. Alternatively, the relative position between the result acquisition device 81 and the substrate 41 may be adjusted to acquire an optical image at each address on the substrate 41 by providing the result acquisition device 81 with a drive mechanism and moving the result acquisition device 81.

In the analysis device 82, the optical image acquired by the result acquisition device 81 is analyzed to extract information on the cellular response in the cell 22 that has reacted with the first compound 321 or the second compound 322 in the first coalesced liquid droplet 71 or the second coalesced liquid droplet 72. As the information on the cellular response, there are given, for example, the size of the cell 22, the rough shape of the cell 22, the size of a nucleus in the cell 22, and the fluorescence intensity obtained through use of a fluorescent dye, but the present invention is not limited thereto. The first liquid droplet 51 and the second liquid droplet 61 in which coalescence has not occurred, or the first liquid droplet 51 that does not contain the cells 22 are also identified by analyzing the optical image acquired by the result acquisition device 81.

In order to acquire information on the cellular response in association with the reaction between the cell 22 and the first compound 321 or the second compound 322, the following information on the cell 22 before the reaction may be acquired. That is, the information on, for example, the average size of the cells 22, the rough shape of the cell 22, the size of a nucleus in the cell 22, and the fluorescence intensity obtained through use of a fluorescent dye may be acquired. In addition, immediately after the first discharge portion 24 forms the first liquid droplets 51 at all the required addresses on the substrate 41, the information on the cells 22 in the first liquid droplets 51 may be acquired and recorded through use of the result acquisition device 81. As the information acquired here, there are given, for example, the size of the cell 22, the rough shape of the cell 22, the size of a nucleus in the cell 22, and the fluorescence intensity obtained through use of a fluorescent dye.

In the analysis step, the analysis device 82 analyzes the results acquired by the result acquisition device 81 in the result acquisition step and specifies a portion in which the results satisfying predetermined criteria are obtained among the plurality of portions on the substrate 41. Specifically, the analysis device 82 analyzes the optical images of the cells 22 and records the address on the substrate 41 at which a predetermined cellular response is demonstrated among the cellular responses exhibited in the first coalesced liquid droplets 71 or the second coalesced liquid droplets 72. Here, as the predetermined cellular response, there are given, for example, the size of the cell 22, the rough shape of the cell 22, the size of a nucleus in the cell 22, and the absolute value of the fluorescence intensity obtained through use of a fluorescent dye, which are set in advance. In addition, the predetermined cellular response may also satisfy the criteria, which are set in advance, for the difference between the measured values in predetermined evaluation items before and after the reaction between the cell 22 and the first compound 321 or the second compound 322.

Figure 9:
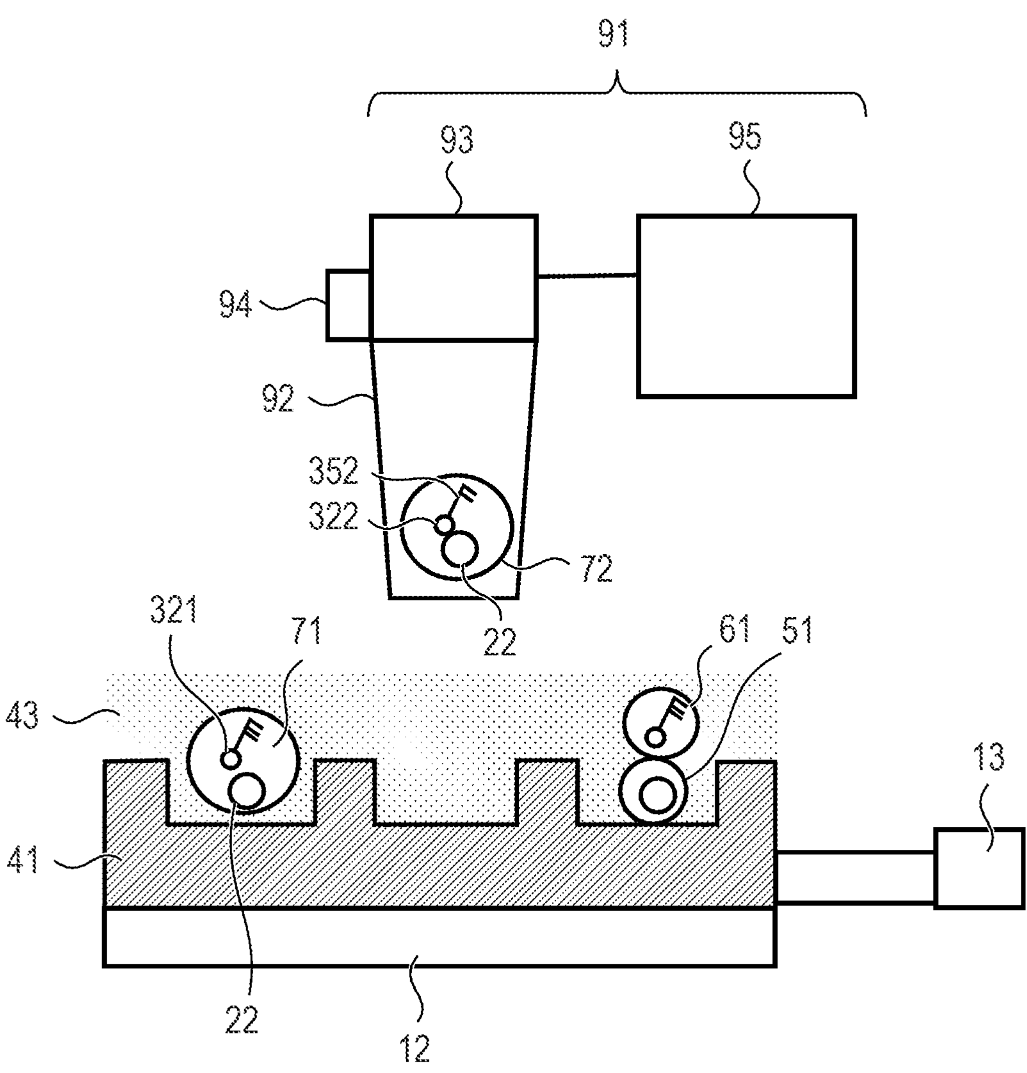
FIG. 9 is a view for illustrating a configuration for identifying a compound that has contributed to a predetermined cellular response.

FIG. 9 is a view for illustrating a configuration for identifying a compound that has contributed to a predetermined cellular response.

The compound identification device 91 includes a suction portion 92, a collection container 93, a height drive portion 94, and a tag identification device 95. The suction portion 92 is a constituent element that collects a coalesced liquid droplet on the substrate 41. The collection container 93 is a constituent element that stores a compound contained in the collected liquid droplet. The height drive portion 94 is a constituent element that adjusts the height of the suction portion 92. In addition, the tag identification device 95 is a constituent element that reads out a tag attached to the compound from the collected compound.

In the identification step, the compound identification device 91 specifies the kind of the compound derived from the second liquid 33 discharged to the portion specified in the analysis step. The specific procedure is as described below.

First, in the analysis device 82, the address on the substrate 41 at which the predetermined cellular response is demonstrated is sent to the stage control unit 13, and the stage 12 is moved so that the relative position between the substrate 41 on the stage 12 and the suction portion 92 becomes zero. Then, the relative position in the height direction of the suction portion 92 is adjusted by the height drive portion 94 to such a degree that the suction portion 92 is brought into contact with the third liquid 43 on the substrate 41 at the address on the substrate 41, and the suction portion 92 collects the coalesced liquid droplet through the action such as suction by applying a negative pressure. When the collection is completed, the suction portion 92 is moved by the height drive portion 94 so as to have an appropriate distance from the liquid surface of the third liquid 43.

In FIG. 9, there is illustrated an example in which the second coalesced liquid droplet 72 containing the second compound 322 and the cell 22, which has demonstrated the predetermined cellular response, is collected by the suction portion 92.

Further, after the second coalesced liquid droplet 72 collected by the suction portion 92 passes through a filter (not shown) or undergoes chemical treatment to remove impurities, the second liquid 33 containing the second compound 322 is stored in the collection container 93. In this case, the residue of the chemical treatment may be mixed in addition to the second liquid to such an extent that identification is not influenced.

In this embodiment, the first compound 321 and the second compound 322 are each modified with a labeling substance so that the kind of the compound can be uniquely identified. In the identification step, the compound identification device 91 specifies the kind of the compound based on the labeling substance. Here, the labeling substance functions as a tag that is read out by the tag identification device 95.

That is, the labeling substance 352 for identifying the second compound 322 provided to the second compound 322 stored in the collection container 93 is read out by the tag identification device 95. With this configuration, it is determined that the second coalesced liquid droplet 72 that has demonstrated the predetermined cellular response contains the second compound 322.

When the labeling substance for identifying the compound is DNA, the tag identification device 95 is preferably a PCR device or a DNA sequencer. In addition, when the labeling substance for identifying the compound is a fluorescent substance, the tag identification device 95 is preferably a spectrometer.

The stage control unit 13 moves the stage 12. Then, the coalesced liquid droplets for all the addresses recorded by the analysis device 82 are collected, and the tags attached to the compounds are read out. The first coalesced liquid droplet 71 from which the predetermined cellular response has not been obtained and the first liquid droplets 51 and the second liquid droplets 61 in which coalescence has not occurred are not collected in accordance with the addresses recorded by the analysis device 82.

When a heterogeneous cell is used as the cell 22 contained in the first liquid 23, and a test compound for testing responsiveness to each of the cells is used as the compound contained in the second liquid 33, for example, a cell collection device may be used as the compound identification device 91.

Figure 11:
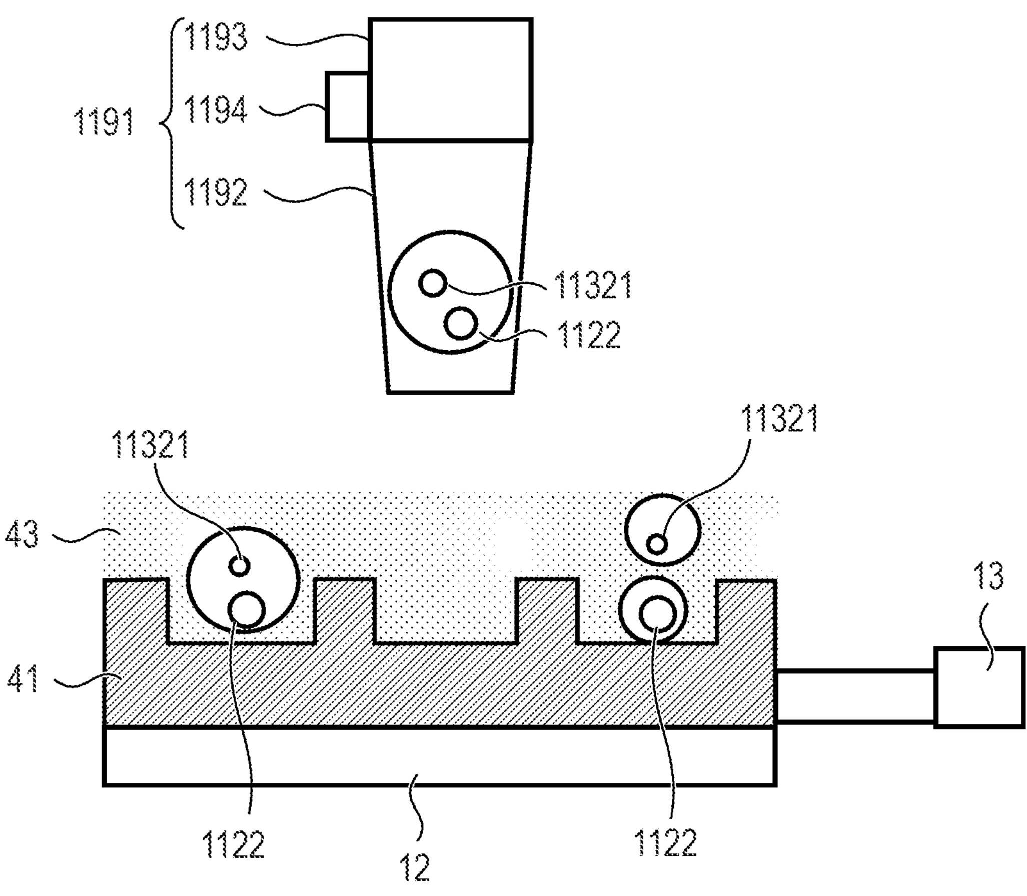
FIG. 11 is a view for illustrating a state of collection by a cell collection device.

FIG. 11 is a view for illustrating a state of collection by the cell collection device 1191. The cell collection device 1191 includes a suction portion 1192 that collects a coalesced liquid droplet on the substrate 41, a collection container 1193 that collects and stores a cell from the collected liquid droplet, and a height drive portion 1194 that adjusts the height of the suction portion 1192.

The address on the substrate 41 stored in the analysis device 82 is sent to the stage control unit 13, and the stage 12 is moved so that the relative position between the substrate 41 on the stage 12 and the suction portion 1192 becomes zero. Then, the relative position in the height direction of the suction portion 1192 is adjusted by the height drive portion 1194 to such a degree that the suction portion 1192 is brought into contact with the third liquid 43 on the substrate 41 at the address on the substrate 41, and the suction portion 1192 collects the coalesced liquid droplet through the action such as suction by applying a negative pressure. When the collection is completed, the suction portion 1192 is moved by the height drive portion 1194 so as to have an appropriate distance from the liquid surface of the third liquid 43.

After the coalesced liquid droplet collected by the suction portion 1192 passes through a filter (not shown) or undergoes chemical treatment to remove impurities, the coalesced liquid droplet is stored in the collection container 1193. The stage 12 is moved through drive of the stage control unit 13, and cells 1122 are collected from the coalesced liquid droplets at all the addresses recorded by the analysis device 82 and stored in the collection container 1193. Here, the cells 1122 are heterogeneous cells. The cells 1122 stored in the collection container 1193 are analyzed by, for example, a gene analyzing device or a protein analyzing device. As a result, the cells that demonstrate specific response to a test compound 11321 are collected and analyzed.

An existing pharmaceutical compound may be used as the test compound 11321, and a plurality of kinds of disease model cells may be used as the cells 1122. In this case, the analysis of disease model cells indicating a desired cellular response can be utilized for drug repositioning for evaluating new drug efficacy of known pharmaceuticals.

A plurality of kinds of test compounds 11321 may be used. In this case, as described above, it is preferred that the test compounds 11321 be modified with labeling substances functioning as tags for identification, and when the coalesced liquid droplets are collected, the tags attached to the test compounds 11321 be read out simultaneously with the collection of the cells 1122.

In the above-mentioned embodiment, there is described an example in which, when the stage 12 on a common platform 11 is moved, the substrate 41 is moved to positions corresponding to the first discharge portion 24, the second discharge portion 34, the result acquisition device 81, and the compound identification device 91, but the present invention is not limited thereto. Any one of the substrate 41, the first discharge portion 24, the second discharge portion 34, the result acquisition device 81, or the compound identification device 91 may be moved by any method, including manual setting, for example.

Figure 10:
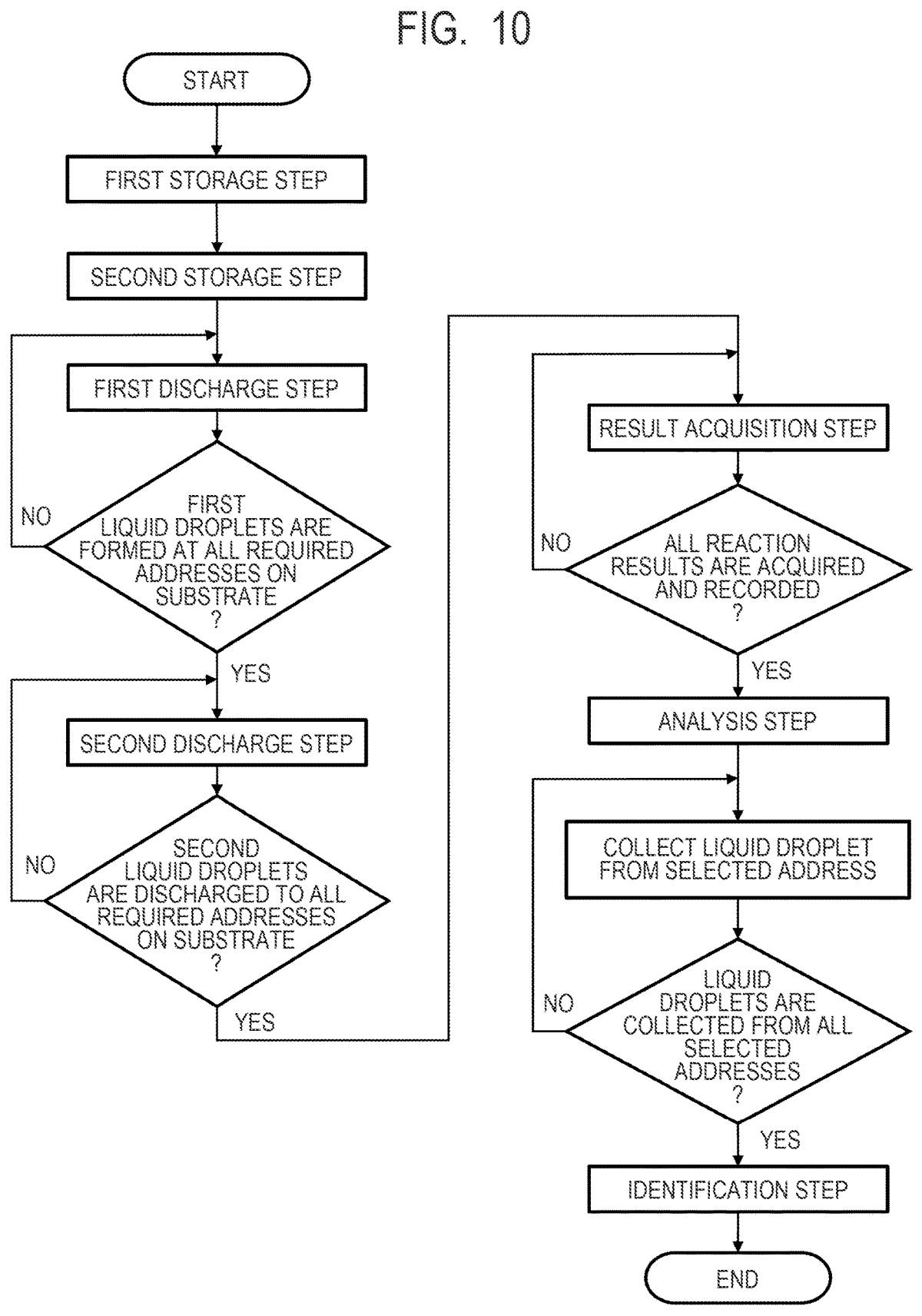

A flowchart that summarizes the steps described above is illustrated in FIG. 10.

The cell analysis method and the cell analysis device according to one embodiment of the present invention described above enable a compound that demonstrates a predetermined cellular response to be specified at high throughput.

In this embodiment, an example using two kinds of compounds is described. However, when this embodiment is applied to drug discovery screening, compounds that each demonstrate a predetermined cellular response indicating drug efficacy can be specified by the similar procedure even when there are thousands of kinds of compounds. In general, when drug discovery screening is performed, there are very few compounds from which a predetermined cellular response indicating drug efficacy is obtained. However, in this embodiment, liquid droplets can be formed at high speed by discharging with the mechanism of the on-demand inkjet device. Then, the cells in the coalesced liquid droplets at the plurality of addresses on the substrate are analyzed at once by the analysis device, and only the compounds in the liquid droplets that have demonstrated a predetermined response are finally identified, with the result that phenotypic screening can be performed at high speed. In addition, when this embodiment is applied, a combination that demonstrates a predetermined cellular response can be specified from within about tens of kinds of existing pharmaceutical compounds that are known to be effective to certain diseases and a plurality of kinds of pharmaceutical compounds from which a predetermined cellular response to a specific disease cell is obtained. As a result, this embodiment can also be utilized in the field of personal medicine.

In the above-mentioned embodiment, there is described an example of a configuration including one first tank 21, one first discharge portion 24 connected to the first tank 21 so as to allow circulation of the liquid, one second tank 31, and one second discharge portion 34 connected to the second tank 31 so as to allow circulation of the liquid. The cell analysis method and cell analysis system according to the present invention are not limited thereto, and the number of any one or more of the above-mentioned constituent elements may be two or more.

For example, in the second storage step, the second liquid may be stored in a plurality of second tanks, and in the second discharge step, the second liquid may be discharged through use of a plurality of second discharge portions respectively connected to the second tanks that are different from each other so as to allow circulation of the liquid. In this case, the kinds of compounds contained in the second liquid may be different from each other among the second liquids respectively stored in the plurality of second tanks. Further, in the second discharge step, whether to discharge the second liquid to each of the plurality of portions on the substrate may be controlled regarding each of the plurality of second discharge portions.

In addition, for example, in the first storage step, the first liquid may be stored in a plurality of first tanks, and in the first discharge step, the first liquid may be discharged through use of a plurality of first discharge portions respectively connected to the first tanks that are different from each other so as to allow circulation of the liquid. In this case, the kinds of cells contained in the first liquid may be different from each other among the first liquids respectively stored in the plurality of first tanks. Further, in the first discharge step, whether to discharge the first liquid to each of the plurality of portions on the substrate may be controlled regarding each of the plurality of first discharge portions.

A modification example of the suitable embodiment of the present invention using a plurality of second tanks and a plurality of second discharge portions is described below.

Figure 12:
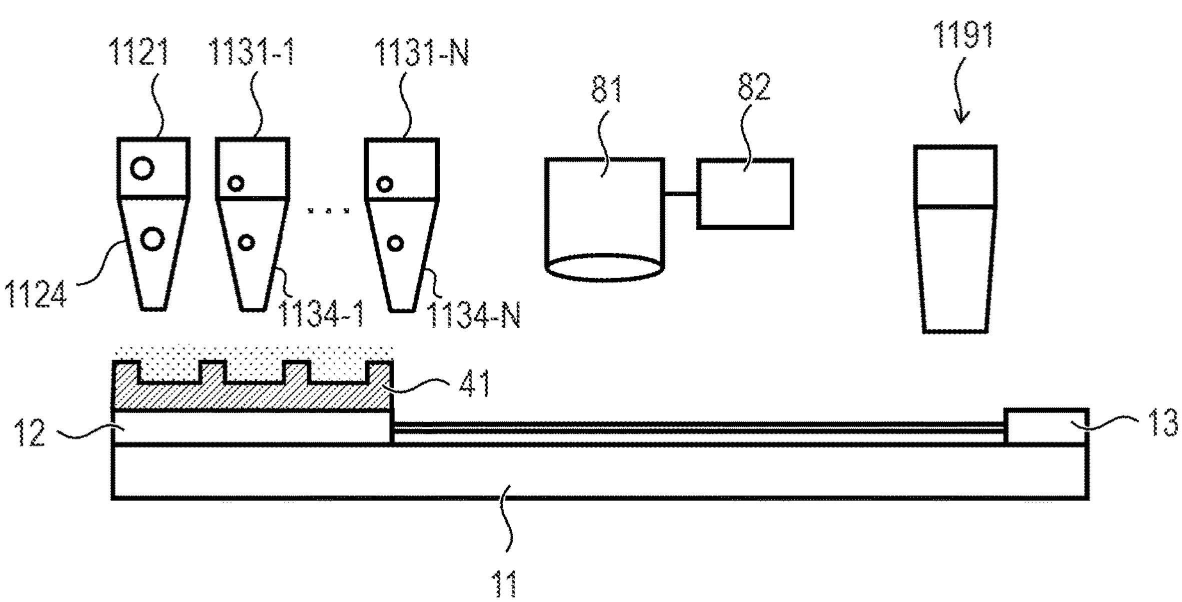
FIG. 12 is a view for illustrating an example in which the cell analysis system according to the present invention is applied to analysis of specificity of a cell with respect to a combination of a plurality of kinds of compounds.

FIG. 12 is a view for illustrating an example in which the cell analysis system according to the present invention is applied to analysis of specificity of a cell with respect to a combination of a plurality of kinds of compounds.

A cell analysis system 20 according to the present invention includes second tanks 1131-1 to 1131-N and second discharge portions 1134-1 to 1134-N.

As possible discharge patterns in the second discharge portions 1134-1 to 1134-N, two patterns of discharging and not discharging can be selected in each of the second discharge portions, and hence combinations of 2 to the Nth power patterns in total are possible. Thus, when each second liquid stored in N second tanks contains one kind of compounds that are different from each other, combinations of 2 to the Nth power patterns of compounds at maximum can be applied to each cell.

The compound contained in the second liquid stored in each of the second tanks 1131-1 to 1131-N may be a single compound or may be a plurality of kinds of compounds. In addition, the compounds that enter N second tanks 1131-1 to 1131-N may be different from each other, but are not limited thereto.

Which address on the substrate 41 each of the second discharge portions 1134-X (X=1 to N) discharges the compound at is not limited to a particular aspect as long as such discharge is effective for screening.

In addition, although not shown, there may be a configuration in which M first tanks 1121 and M first discharge portions 1124 are arranged to provide the first tanks 1121-1 to 1121-M and the first discharge portions 1124-1 to 1124-M. In this case, the first tank 1121-X (X=1 to M) and the first discharge portion 1124-X (X=1 to M) may contain cells having different specificities, and may discharge M kinds of cells individually to different addresses on the substrate 41. Alternatively, M kinds of cells may be discharged to the same address on the substrate 41 in any combination.

Which address on the substrate 41 each of the first discharge portions 1124-X (X=1 to M) discharges the cells at is not limited to a particular aspect as long as such discharge is effective for screening.

When M first discharge portions are present, the possible discharge patterns in the first discharge portions are 2 to the Mth power patterns.

The cells contained in the first liquid stored in each of the first tanks 1121-1 to 1121-M may be single cells or a mixture of a plurality of kinds of cells. In addition, the kinds of cells that enter N second tanks 1131-1 to 1131-N may be different from each other, but are not limited thereto.

Although not shown, a configuration in which M first tanks 1121 and M first discharge portions 1124 are arranged and a configuration in which N second tanks 1131 and N second discharge portions 1134 are arranged may be used together or only one of the configurations may be adopted.

As described above, in the cell analysis method and the cell analysis system according to the modification example of the suitable embodiment of the present invention, complex phenotypic screening can be performed by varying the combination of the compounds or the combinations of the cells.

The method of specifying the kind of a compound in the present invention is not limited to a specific system as long as the method can be actually implemented in a system. For example, a spectrophotometer may be used to specify a compound.

In addition, in the suitable embodiment of the present invention, there is described an example using, as the storage form of the compound, a double liquid droplet, a porous fine particle, a lipid particle, an adsorbing fine particle, or the like, but for example, a configuration that cleaves the storage form during or after discharge may be additionally provided. For example, the double liquid droplet or the particle carrying compounds may also be cleaved through use of stimuli such as an electromagnetic wave, a temperature, and an ultrasonic wave.

The suitable embodiment of the present invention has been described above, but the above-mentioned embodiment is merely illustrative in all respects and is not intended to limit the scope of the present invention.

According to the present invention, a cell analysis method and a cell analysis system capable of performing phenotypic screening at high throughput can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-067941, filed Apr. 15, 2022, which is hereby incorporated by reference herein in its entirety.

What is claimed is:

1. A cell analysis method comprising:

a first storage step of storing a first liquid containing a cell in a first tank;

a second storage step of storing a second liquid in a second tank, the second liquid containing a compound and being compatible with the first liquid;

a first discharge step of discharging the first liquid to a plurality of portions on a substrate through use of a first discharge portion connected to the first tank so as to allow liquid circulation, the plurality of portions capable of being specified based on addresses, to thereby form a plurality of first liquid droplets;

a second discharge step of discharging, based on the addresses of the plurality of portions to which the first liquid is discharged, the second liquid to the plurality of portions on the substrate through use of a second discharge portion in such a manner that the second liquid is allowed to be admixed with the first liquid droplets, the second discharge portion being connected to the second tank so as to allow liquid circulation;

a result acquisition step of acquiring results of a reaction between the cell and the compound caused by admixture of the first liquid droplets and the second liquid discharged from the second discharge portion;

an analysis step of analyzing the results acquired in the result acquisition step to specify an address of a portion in which results satisfying predetermined criteria are obtained among the plurality of portions; and a collection step of collecting a coalesced droplet of a first liquid droplet containing the cell and the second liquid by aligning a collection portion with the portion on the substrate specified in the analysis step based on the address.

2. The cell analysis method according to claim 1, wherein each of the plurality of portions on the substrate includes a third liquid that is incompatible with both the first liquid and the second liquid, wherein, in the first discharge step, the first liquid droplets are formed in the third liquid, and wherein, in the second discharge step, the second liquid is discharged so as to form second liquid droplets in the third liquid where the first liquid droplets and the second liquid discharged from the second discharge portion are allowed to be admixed with each other through the first liquid droplet and the second liquid droplet contacting each other.

3. The cell analysis method according to claim 1, wherein the compound contained in the second liquid includes a plurality of kinds of compounds, and wherein the cell analysis method further comprises an identification step of specifying a kind of the compound derived from the second liquid discharged to the portion specified in the analysis step.

4. The cell analysis method according to claim 3, wherein the plurality of kinds of compounds are each modified with a labeling substance so that the kind of the compound is uniquely identified, and wherein, in the identification step, the kind of the compound is specified based on the labeling substance.

5. The cell analysis method according to claim 4, wherein the labeling substance is DNA.

6. The cell analysis method according to claim 4, wherein the labeling substance is a fluorescent substance.

7. The cell analysis method according to claim 1, wherein, in the second storage step, the second liquid is stored in a plurality of second tanks;

wherein, in the second discharge step, the second liquid is discharged through use of a plurality of second discharge portions connected respectively to the plurality of second tanks that are different from each other so as to allow liquid circulation;

wherein a kind of the compound contained in the second liquid varies among the second liquids stored respectively in the plurality of second tanks, and wherein, in the second discharge step, whether to discharge the second liquid to each of the plurality of portions on the substrate is controlled regarding each of the plurality of second discharge portions.

8. The cell analysis method according to claim 1, wherein the first liquid contains a plurality of kinds of cells.

9. The cell analysis method according to claim 1, wherein, in the first storage step, the first liquid is stored in a plurality of first tanks, wherein, in the first discharge step, the first liquid is discharged through use of a plurality of first discharge portions connected respectively to the plurality of first tanks that are different from each other so as to allow liquid circulation, wherein a kind of the cell contained in the first liquid varies among the first liquids stored respectively in the plurality of first tanks, and wherein, in the first discharge step, whether to discharge the first liquid to each of the plurality of portions on the substrate is controlled regarding each of the plurality of first discharge portions.

10. The cell analysis method according to claim 1, wherein, in the second storage step, the second liquid is stored in a plurality of second tanks, wherein, in the second discharge step, the second liquid is discharged through use of a plurality of second discharge portions connected respectively to the plurality of second tanks that are different from each other so as to allow liquid circulation;

wherein a kind of the compound contained in the second liquid varies among the second liquids stored respectively in the plurality of second tanks, wherein, in the second discharge step, whether to discharge the second liquid to each of the plurality of portions on the substrate is controlled regarding each of the plurality of second discharge portions, wherein, in the first storage step, the first liquid is stored in a plurality of first tanks, wherein, in the first discharge step, the first liquid is discharged through use of a plurality of the first discharge portions connected respectively to the plurality of first tanks that are different from each other so as to allow liquid circulation, wherein a kind of the cell contained in the first liquid varies among the first liquids stored respectively in the plurality of first tanks in the first storage step, and wherein, in the first discharge step, whether to discharge the first liquid to each of the plurality of portions on the substrate is controlled regarding each of the plurality of first discharge portions.

11. The cell analysis method according to claim 1, wherein the cell contains a fluorescent dye.

12. The cell analysis method according to claim 1, wherein the compound contained in the second liquid is encapsulated in a region surrounded by a liquid that is incompatible with the second liquid.

13. The cell analysis method according to claim 1, wherein the compound contained in the second liquid is carried in a porous fine particle.

14. The cell analysis method according to claim 1, wherein the compound contained in the second liquid is carried on a surface of a fine particle.

15. The cell analysis method according to claim 1, wherein, in the first discharge step, the first discharge portion discharges the first liquid so that the first liquid discharged in one discharge contains one or more cells.

16. The cell analysis method according to claim 1, wherein, in the second discharge step, the second discharge portion discharges the second liquid so that the second liquid discharged in one discharge contains one or more molecules of the compound.

17. The cell analysis method according to claim 1, wherein the results acquired in the result acquisition step are optical images, and wherein the analysis of the results in the analysis step is image analysis of the optical images.

18. The cell analysis method according to claim 1, wherein the substrate includes a plurality of wells separated from each other by two-dimensional compartments, wherein the plurality of portions on the substrate are portions in which the plurality of wells are formed, and wherein the address specifies a specific portion of the well.

19. The cell analysis method according to claim 1, wherein the first discharge step and the second discharge step are each a step of discharging a liquid by an inkjet system.

20. A cell analysis system comprising:

a stage configured to allow a substrate to be set thereon;

a first tank configured to store a first liquid containing a cell;

a second tank configured to store a second liquid that contains a compound and is compatible with the first liquid;

a first discharge portion, which is connected to the first tank so as to allow liquid circulation, and which is configured to discharge the first liquid to a plurality of portions on the substrate, to thereby form a plurality of first liquid droplets, the plurality of portions capable of being specified based on addresses;

a second discharge portion, which is connected to the second tank so as to allow liquid circulation, and which is configured to discharge, based on the addresses of the plurality of portions to which the first liquid is discharged, the second liquid to the plurality of portions on the substrate in such a manner that the second liquid is allowed to be admixed with the first liquid droplets;

a result acquisition portion configured to acquire results of a reaction between the cell and the compound caused by admixture of the first liquid droplets and the second liquid discharged from the second discharge portion; and an analysis portion configured to analyze the results acquired by the result acquisition portion to specify an address of a portion in which results satisfying predetermined criteria are obtained among the plurality of portions; and a collection portion configured to collect a coalesced droplet of a first liquid droplet containing the cell and the second liquid by aligning a collection portion with the portion on the substrate specified by the analysis portion based on the address.

* * * * *